(No Model.)

W. B. BULL.
MEANS FOR PREVENTING BOILER INCRUSTATION.

No. 430,461. Patented June 17, 1890.

Witnesses
E. D. Smith
Thomas Durant

Inventor
William B. Bull,
By his Attorneys
Church & Church

UNITED STATES PATENT OFFICE.

WILLIAM B. BULL, OF QUINCY, ILLINOIS.

MEANS FOR PREVENTING BOILER INCRUSTATION.

SPECIFICATION forming part of Letters Patent No. 430,461, dated June 17, 1890.

Application filed November 7, 1889. Serial No. 329,479. (No model.)

*To all whom it may concern:*

Be it known that I, WILLIAM B. BULL, of Quincy, in the county of Adams and State of Illinois, have invented certain new and useful Improvements in Means for Clearing Liquids of Impurities to Prevent Boiler Incrustation, &c.; and I do hereby declare the following to be a full, clear, and exact description of the same, reference being had to the accompanying drawings, forming a part of this specification, and to the letters of reference marked thereon.

My invention relates, generally speaking, to that class of inventions wherein the influence exerted on the liquid employed in the generation of steam or other purposes by a magnetic field is utilized to prevent the deposit of injurious substances or incrustation; and the invention has for its object to greatly simplify the means employed as well as to increase the efficiency of the same, adapting the invention for application to pressure generators or boilers or tanks of any style, either stationary, portable, or locomotive.

The invention consists, broadly, in locating a magnet in proximity to the feed-water pipe, whereby the liquid is caused to pass through a magnetic field by means of an exceedingly simple and inexpensive device, and, secondly, it consists in certain novel details in the arrangement, construction, and combinations of the parts, all as will be hereinafter described, and pointed out particularly in the claims at the end of this specification.

Figure 1:
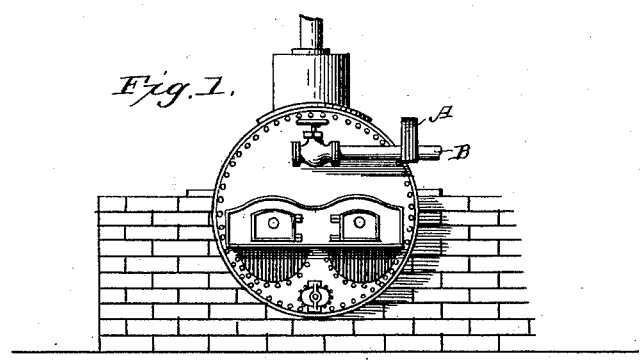
Figure 2:
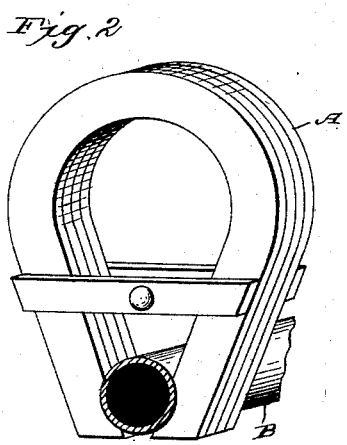
Figure 3:
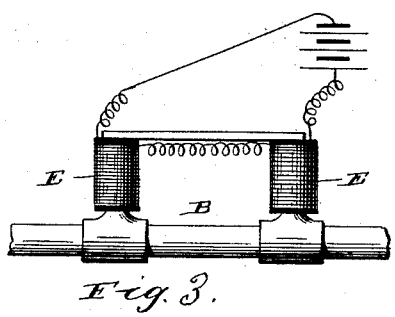
Figure 4:
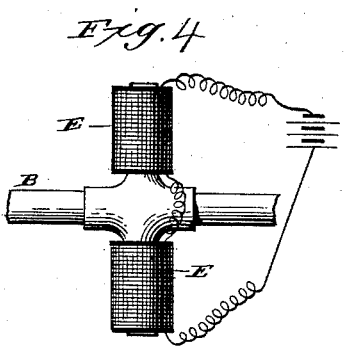

In the accompanying drawings, wherein are illustrated several forms of apparatus for carrying my present invention into practice, Figure 1 is a side view of a steam-boiler, showing the application of the preferred form of apparatus. Fig. 2 is an enlarged section of the feed-water pipe and magnet. Figs. 3 and 4 illustrate modifications.

Similar letters of reference in the several figures indicate the same parts.

It is a well-settled fact that by subjecting the water in a steam-boiler to the influence of a magnet or locating the same in a magnetic field incrustation or deposit is prevented and removed, and that better results are obtained by passing the water flowing into the boiler through a magnetic field, which field may thus be concentrated on the comparatively small body of liquid passing at a given moment through the conduit.

In the preferred construction the ordinary feed-water pipe or conduit is not altered in the least, and the magnetic field is created by a magnet surrounding or exerting its influence on the conduit and the water passing through the same. Constructions for carrying this idea into effect may be of various kinds, that illustrated in Fig. 2 being preferred, and consists of an ordinary permanent horseshoe magnet A, applied to the feed-water pipe B, preferably with one pole on each side, as shown.

In Figs. 3 and 4 specific adaptations of the invention are shown, consisting, essentially, of arms E, extending laterally from the feed-water pipe and surrounded by helices through which electric currents are established. In these instances the arms E, constituting in effect the cores of the helices, are of magnetic material—such as short sections of ordinary iron pipe united to the feed-water pipe, as shown—although the pipe itself need not be of magnetic material in any of the forms shown.

It is preferable that the feed-water pipe be subjected to the magnetic influence at a point in proximity to the boiler, although, as is obvious, the pipe or conduit may be conducted through such a field at any point; or the principle may be adapted and applied to cause a desired effect or prevent injurious deposits where they are likely to occur in any receptacle or receiver other than a steam-boiler; or the water may be subjected to such influence before entering the tank from whence it is supplied to the boilers.

By subjecting the relatively small body of water in the feed-water pipe to the action of the concentrated magnetic field the effect is greatly intensified and the results accomplished proportionally greater than where the liquid in the receiver was acted upon as a body. Further than this, it will be seen that the invention is peculiarly adapted for application to apparatus now in position for clearing the liquid without changing the construction of the parts in the least. On locomotives, for instance, it is practically impossible to apply the devices heretofore constructed to any advantage, as any apparatus which encumbers the already limited space must be discarded.

More than one magnet may be employed, either close together or at different points along the conduit, and while I have particularly described the invention as applied to steam-boilers I do not wish to be limited to such application, as it may be applied in other situations where it is desired to subject a body of liquid passing into a receiver to the action of a magnetic field.

Having thus described my invention, what I claim as new is—

1. The combination, with a steam-boiler and a relatively small feed-water pipe leading into the same, of a magnet having its pole or poles surrounding said pipe, whereby an intense magnetic field is formed within the pipe, substantially as described.

2. The combination, with a steam-boiler and a relatively small feed-water pipe leading into the same, of a magnet having its pole or poles in proximity to said pipe, whereby the pipe is embraced within a magnetic field, substantially as described.

3. The combination, with a liquid receiver or boiler and its feed-conduit, of a permanent magnet in proximity to and embracing said conduit within its field of force, substantially as described.

4. The combination, with a liquid receiver or boiler and its feed-conduit, of a permanent magnet having its poles surrounding said conduit, substantially as described.

WILLIAM B. BULL.

Witnesses:
DORR R. GWINN,
CHARLES R. HENDERSON.